(12) United States Patent
Odendall

(10) Patent No.: US 10,352,224 B2
(45) Date of Patent: Jul. 16, 2019

(54) METHOD OF OPERATING A DRIVE DEVICE AND CORRESPONDING DRIVE DEVICE

(71) Applicant: AUDI AG, Ingolstadt (DE)

(72) Inventor: Bodo Odendall, Lenting (DE)

(73) Assignee: Audi AG, Ingolstadt (DE)

( * ) Notice: Subject to any disclaimer, the term of this patent is extended or adjusted under 35 U.S.C. 154(b) by 190 days.

(21) Appl. No.: 15/215,160

(22) Filed: Jul. 20, 2016

(65) Prior Publication Data
US 2017/0022873 A1  Jan. 26, 2017

(30) Foreign Application Priority Data

Jul. 22, 2015 (DE) .................. 10 2015 009 489

(51) Int. Cl.
| | | |
|---|---|---|
| *F01N 11/00* | (2006.01) | |
| *F02D 41/14* | (2006.01) | |
| *F02D 41/22* | (2006.01) | |
| *G01M 15/10* | (2006.01) | |

(52) U.S. Cl.
CPC ........ *F01N 11/002* (2013.01); *F02D 41/1494* (2013.01); *F02D 41/1495* (2013.01); *F02D 41/222* (2013.01); *G01M 15/102* (2013.01); *F01N 2560/20* (2013.01); *Y02T 10/40* (2013.01)

(58) Field of Classification Search
CPC .... F02D 41/1494; F02D 41/222; F02D 41/22; F02D 41/1495; F01N 2900/0422; F01N 2900/0602; F01N 2900/0416; F01N 2900/1811; F01N 2550/22; F01N 2560/20; F01N 11/002; G01M 15/102; Y02T 10/40

USPC .................. 123/697, 690, 685, 568.31, 688; 73/114.69; 374/102, 144
See application file for complete search history.

(56) References Cited

U.S. PATENT DOCUMENTS

| | | | | |
|---|---|---|---|---|
| 4,291,572 A | * | 9/1981 | Maurer ............... | F02D 41/1494 60/276 |
| 4,524,264 A | * | 6/1985 | Takeuchi ........... | G05D 23/2401 219/209 |
| 4,962,299 A | * | 10/1990 | Duborper .............. | A47J 27/004 219/492 |
| 5,228,426 A | | 7/1993 | Pursifull et al. | |
| 5,505,183 A | * | 4/1996 | Sinha .................. | F02D 41/1494 123/688 |
| 5,669,219 A | * | 9/1997 | Schnaibel ........... | F02D 41/1494 123/697 |
| 5,681,494 A | * | 10/1997 | Suzuki ............... | G03G 15/2003 219/216 |

(Continued)

FOREIGN PATENT DOCUMENTS

| | | |
|---|---|---|
| DE | 43 35 824 | 5/1994 |
| DE | 10 2007 035 188 | 5/2009 |

(Continued)

*Primary Examiner* — Jonathan M Dunlap
(74) *Attorney, Agent, or Firm* — Henry M. Feiereisen LLC

(57) ABSTRACT

In a method of operating a drive device, a probe temperature of an exhaust gas exhaust gas probe in an exhaust tract is measured, as the exhaust gas probe is heated by a probe heater. A temperature growth value representative of an increase in temperature of the exhaust gas probe is determined during heating of the exhaust gas probe, and the presence of a defect of the probe heater is recognized, when the temperature growth value deviates from an input value.

6 Claims, 2 Drawing Sheets

(56) References Cited

U.S. PATENT DOCUMENTS

| | | | | |
|---|---|---|---|---|
| 5,711,606 A * | 1/1998 | Koether | ............. | G05D 23/1917 374/102 |
| 5,766,947 A * | 6/1998 | Rittershaus | ........ | C07K 16/2809 424/142.1 |
| 5,822,978 A * | 10/1998 | Streit | ...................... | B60R 16/03 60/274 |
| 6,034,610 A * | 3/2000 | Schnaibel | ............... | F02B 39/16 123/679 |
| 6,142,666 A * | 11/2000 | Koether | .................. | A47J 27/62 374/102 |
| 6,996,499 B2 * | 2/2006 | Kurokawa | .......... | G01N 27/4175 204/401 |
| 7,036,982 B2 * | 5/2006 | Smith | ................. | F02D 41/1494 123/679 |
| 7,269,996 B2 * | 9/2007 | Schnaibel | ............ | F01N 11/007 73/114.72 |
| 7,378,703 B2 * | 5/2008 | Jung | ................. | H01L 27/10873 257/213 |
| 7,934,420 B2 * | 5/2011 | Kama | ................. | F02D 41/1441 73/114.69 |
| 8,148,995 B2 * | 4/2012 | Hashimoto | ......... | F02D 41/1494 324/511 |
| 8,386,155 B2 * | 2/2013 | Huang | ................ | F02D 41/1495 123/697 |
| 8,490,465 B2 * | 7/2013 | Ante | ................... | F02D 41/1466 73/23.2 |
| 8,504,278 B2 * | 8/2013 | Verner | .................... | F01N 3/101 123/697 |
| 8,573,190 B2 * | 11/2013 | Barnikow | ........... | F02D 41/1494 123/142.5 E |
| 8,650,942 B2 * | 2/2014 | Klenk | ................ | F02D 41/1438 73/114.69 |
| 8,775,051 B2 * | 7/2014 | Hirai | ....................... | F01N 3/101 123/568.31 |
| 8,788,184 B2 * | 7/2014 | Baumann | ................ | F01N 11/00 123/697 |
| 8,924,132 B2 * | 12/2014 | Bouvier | ................ | F01N 11/002 123/685 |
| 9,606,040 B2 * | 3/2017 | Sakamoto | .......... | G01N 15/0656 |
| 9,845,719 B2 * | 12/2017 | Matsuoka | ............. | F01N 11/007 |
| 2006/0089783 A1 * | 4/2006 | Braun | .................. | F01N 11/002 701/114 |
| 2006/0170059 A1 | 8/2006 | Jung et al. | | |
| 2009/0056313 A1 * | 3/2009 | Kama | ................. | F02D 41/1441 60/277 |
| 2010/0218751 A1 | 9/2010 | Barnikow et al. | | |
| 2010/0281854 A1 * | 11/2010 | Huang | ................ | F02D 41/1495 60/276 |
| 2011/0011154 A1 * | 1/2011 | Ante | ..................... | F02D 41/1466 73/23.33 |
| 2011/0099982 A1 * | 5/2011 | Berke | ..................... | F01N 3/021 60/277 |
| 2011/0106392 A1 * | 5/2011 | Verner | .................... | F01N 3/101 701/101 |
| 2011/0268613 A1 * | 11/2011 | Hirai | ..................... | F01N 3/101 422/108 |
| 2012/0023908 A1 | 2/2012 | Klenk et al. | | |
| 2012/0191320 A1 * | 7/2012 | Bouvier | ................ | F01N 11/002 701/102 |
| 2016/0356193 A1 * | 12/2016 | Rodatz | .................... | F01N 3/208 |

FOREIGN PATENT DOCUMENTS

| | | |
|---|---|---|
| DE | 10 2010 002 979 | 9/2011 |
| DE | 10 2011 002 502 | 2/2012 |
| JP | 2002-250710 | 9/2002 |
| JP | 20063240 | 1/2006 |
| JP | 2009-97962 | 4/2009 |

* cited by examiner

METHOD OF OPERATING A DRIVE DEVICE AND CORRESPONDING DRIVE DEVICE

CROSS-REFERENCES TO RELATED APPLICATIONS

This application claims the priority of German Patent Application, Serial No. 10 2015 009 489.0, filed Jul. 22, 2015, pursuant to 35 U.S.C. 119(a)-(d), the disclosure of which is incorporated herein by reference in its entirety as if fully set forth herein.

BACKGROUND OF THE INVENTION

The present invention relates to a method of operating a drive device and to a corresponding drive device.

The following discussion of related art is provided to assist the reader in understanding the advantages of the invention, and is not to be construed as an admission that this related art is prior art to this invention.

A drive device is used, for example, to provide a drive torque for a motor vehicle, i.e. to provide a drive torque for propelling the motor vehicle. The drive device can include, for example, an internal combustion engine which produces exhaust gas which is conducted through an exhaust tract in the direction of the ambient surroundings of the motor vehicle. Disposed in the exhaust tract is an exhaust gas probe to determine or measure at least one characteristic of the exhaust gas that flows in the exhaust tract. Exhaust gas flows hereby through the exhaust gas probe or sweeps over the exhaust gas probe. For example, the exhaust gas probe can be constructed in the form of a lambda probe, constructed to determine a residual oxygen content in the exhaust gas.

In order to be able to accurately determine the at least one exhaust characteristic with the assistance of the exhaust gas probe, it is necessary for the exhaust gas probe to reach its operating temperature. While this may be realized, of course, by heat transfer from exhaust gas to the exhaust gas probe, this process is very time-consuming. The exhaust gas probe may be heated in a faster way by using a probe heater. In particular, when a cold start of the drive device or internal combustion engine is involved, the provision of a probe heater enables determination of the exhaust characteristic after cold start with adequate accuracy. Suitably, the exhaust gas probe is heated by the probe heater immediately at the start of operation of the drive device, in particular when the internal combustion engine is started. This time instance can be designated as start of heating.

The heating process of the exhaust gas probe can be monitored by measuring the probe temperature of the exhaust gas probe, e.g. with a temperature sensor which may be disposed at the exhaust gas probe. The temperature sensor may be a separate component that is mounted onto the exhaust gas probe, or may be integrated in the exhaust gas probe. To check the exhaust gas probe and the probe heater, it has been proposed to measure the probe temperature after elapse of a certain time interval after start of heating and to compare the probe temperature with a temperature limit value. When the probe temperature falls short of the temperature limit value, the presence of a defect of the probe heater is recognized. However, there may be situations in which the exhaust gas probe has reached at the start of heating a probe temperature which, for example, due to high ambient temperature and/or due to a short stoppage of the drive device, is high enough for the probe temperature to exceed the temperature limit value after elapse of the certain time interval, so that a correctly functioning probe heater is assumed, even though that may, in fact, not be the case.

It would therefore be desirable and advantageous to address these problems and to obviate other prior art shortcomings.

SUMMARY OF THE INVENTION

According to one aspect of the present invention, a method of operating a drive device includes measuring a probe temperature of an exhaust gas probe in an exhaust tract, as the exhaust gas probe is heated by a probe heater, determining a temperature growth value representative of an increase in temperature of the exhaust gas probe during heating of the exhaust gas probe, and recognizing the presence of a defect of the probe heater, when the temperature growth value deviates from an input value.

The present invention resolves prior art problems by monitoring the operativeness of the probe heater not based or not only based on the probe temperature per se or based on a comparison of the probe temperature with a temperature limit value, but rather based on a temperature growth value which identifies the temperature increase of the exhaust gas probe.

The temperature growth value can be defined in any manner so long as it relates to the temperature increase of the exhaust gas probe, in particular in a predefined time instance or within a predefined time period. For example, the temperature growth value may be a probe temperature gradient which corresponds to the gradient of the probe temperature over time. As an alternative, the temperature growth value may be a time period between reaching a first temperature value and reaching a second temperature value by the probe temperature. Provision is thus made in a simplest case to acquire at the start of heating the momentary probe temperature in the form of a first temperature value and after elapse of the predefined time interval after start of heating in the form of a second temperature value. Then, the difference between the second and first temperature values can be determined. When the difference exceeds a predefined limit value, operativeness of the probe heater is affirmed. However, when the difference falls short of the limit value, the probe heater is considered defective.

According to another advantageous feature of the present invention, a probe temperature gradient can be used as temperature growth value, and the presence of the defect of the probe heater is recognized, when the probe temperature gradient falls short of a gradient limit value as the input value. In accordance with a first variant of the invention, the probe temperature gradient, i.e. the gradient of the probe temperature over time, is used as temperature growth rate. The gradient limit value is hereby used as input value. When the probe temperature gradient is below the gradient limit value, then this is an indication that the heat output of the probe heater is inadequate. Thus, the probe heater is defective. Stated differently, the probe temperature gradient is determined during heating and when the probe temperature gradient falls short of the gradient limit value, conclusion can be made that the probe heater is defective.

According to another advantageous feature of the present invention, a time period between reaching a first temperature value and reaching a second temperature value by the probe temperature can be used as temperature growth value, and the presence of the defect of the probe heater is recognized, when the probe temperature exceeds a time limit value as the input value. The time period starts when the probe temperature reaches or exceeds the first temperature value and ends when the probe temperature reaches or exceeds the second temperature value. The second temperature value differs hereby from the first temperature value, and is in particular greater than the first temperature value.

When the time period between the first and second temperature values is too long, it can be concluded that the probe heater is defective, i.e. a defect of the probe heater is recognized. In this embodiment, the time period represents the temperature growth value and the time limit value represents the input value. Thus, during heating, the time period is ascertained between which the probe temperature reaches a first temperature value and then a second temperature value, and the presence of a defect of the probe heater is recognized, when the time period exceeds the time limit value.

According to another advantageous feature of the present invention, the probe temperature gradient can be determined after elapse of a predefined time interval after start of heating of the exhaust gas probe or when a temperature limit value is exceeded by the probe temperature. The probe temperature gradient, which is being compared with the gradient limit value, can thus be determined at varying time instances. The probe temperature gradient can hereby be determined after elapse of the predefined time interval after start of heating. As an alternative, the probe temperature gradient may also be determined at or after a time instance in which the probe temperature has reached or exceeded the temperature limit value.

According to another advantageous feature of the present invention, the presence of the defect of the probe heater can be recognized, when the probe temperature falls short of the temperature limit value after elapse of the predefined time interval. This approach can be executed in addition to the afore-described procedures. A first criterion finds application when the temperature growth rate deviates from the input value. A second criterion involves a checking, after elapse of the predefined time interval, as to whether the probe temperature falls short of the temperature limit value. The presence of the defect of the probe heater can then be recognized, when only one of the two criteria is met, i.e. either the first criterion or the second criterion. Provision may, however, also be made to conclude the presence of the defect of the probe heater, when both criteria are met, i.e. the temperature growth value deviates from the input value and the probe temperature is below the temperature limit value after elapse of the predefined time interval.

According to another advantageous feature of the present invention, the probe temperature gradient can be determined by measuring the probe temperature in a first time instance and measuring the probe temperature in a second time instance. Thus, the momentary probe temperature is acquired by way of a first probe temperature in the first time instance, and acquired by way of a second probe temperature in the second time instance. The second time instance occurs after the first time instance and thus differs therefrom. For example, the probe temperature gradient can be determined by dividing the difference between the second probe temperature and the first probe temperature by the distance between the two time instances. Of course, other processes to determine the probe temperature gradient can be used, which for example are based on a greater number of measuring points or probe temperatures. In the afore-described procedure, the first and second time instances and their respective distance to the start of heating can be set so that the first and second probe temperatures are present as variables.

According to another advantageous feature of the present invention, the probe temperature gradient can be determined by ascertaining a time period between reaching a first temperature value and reaching a second temperature value by the probe temperature. Advantageously, the time period is hereby variable, whereas the first and second temperature values are set. Thus, those time instances are determined in which the probe temperature has reached or exceeded the first and second temperature values. The probe temperature gradient can then be ascertained by the time period between the time instances based on the first and second temperature values.

According to another advantageous feature of the present invention, the first and second temperature values can be selected greater than the probe temperature at the start of heating. In this way, the most meaningful results for the temperature growth value, in particular the probe temperature gradient, can be established. Of course, provision may also be made for the first temperature value to correspond to the probe temperature at the start of heating, whereas the second temperature value is greater.

According to another advantageous feature of the present invention, the time interval can be determined on the basis of the probe temperature at the start of heating of the exhaust gas probe. The time interval, based on which the probe temperature gradient is determined or a check is carried out as to whether the probe temperature is below the temperature limit value, is thus determined in dependence on the probe temperature at the start of heating. For example, the time interval is chosen progressively greater as the probe temperature increases in order to provide most meaningful measuring results.

According to another aspect of the present invention, a drive device includes an exhaust gas probe arranged in an exhaust tract, a probe heater configured to heat the exhaust gas probe at least temporarily, a measuring device configured to measure a probe temperature, and a determination device configured to ascertain a temperature growth value representative of an increase in temperature of the exhaust gas probe during heating of the exhaust gas probe by the probe heater, and to recognize the presence of a defect of the probe heater, when the temperature growth value deviates from an input value.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

The depicted embodiment is to be understood as illustrative of the invention and not as limiting in any way. It should also be understood that the figures may not necessarily be to scale. In certain instances, details which are not necessary for an understanding of the present invention or which render other details difficult to perceive may have been omitted.

Figure 1:
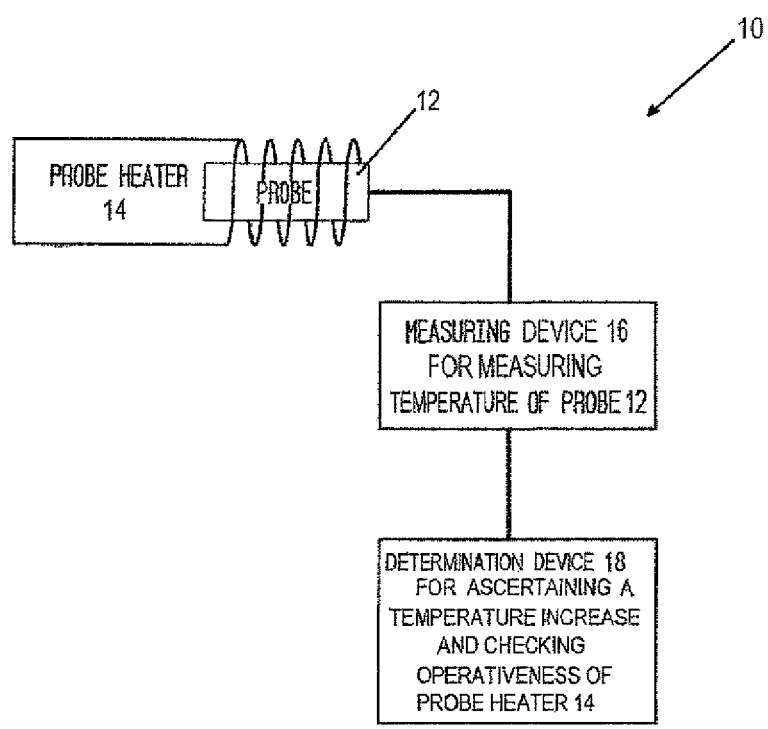
FIG. 1 is a schematic, exemplified illustration by way of a block diagram to illustrate components of a drive device according to the present invention.

Turning now to FIG. 1, there is shown schematic, exemplified illustration by way of a block diagram to illustrate components of a drive device according to the present invention, generally designated by reference numeral 10. The drive device 10 includes an exhaust gas probe 12 arranged in an exhaust tract and heated, at least temporarily, by a probe heater 14 to increase a probe temperature T of the exhaust gas probe 12. the probe temperature T is measured by a measuring device 16.

Figure 2:
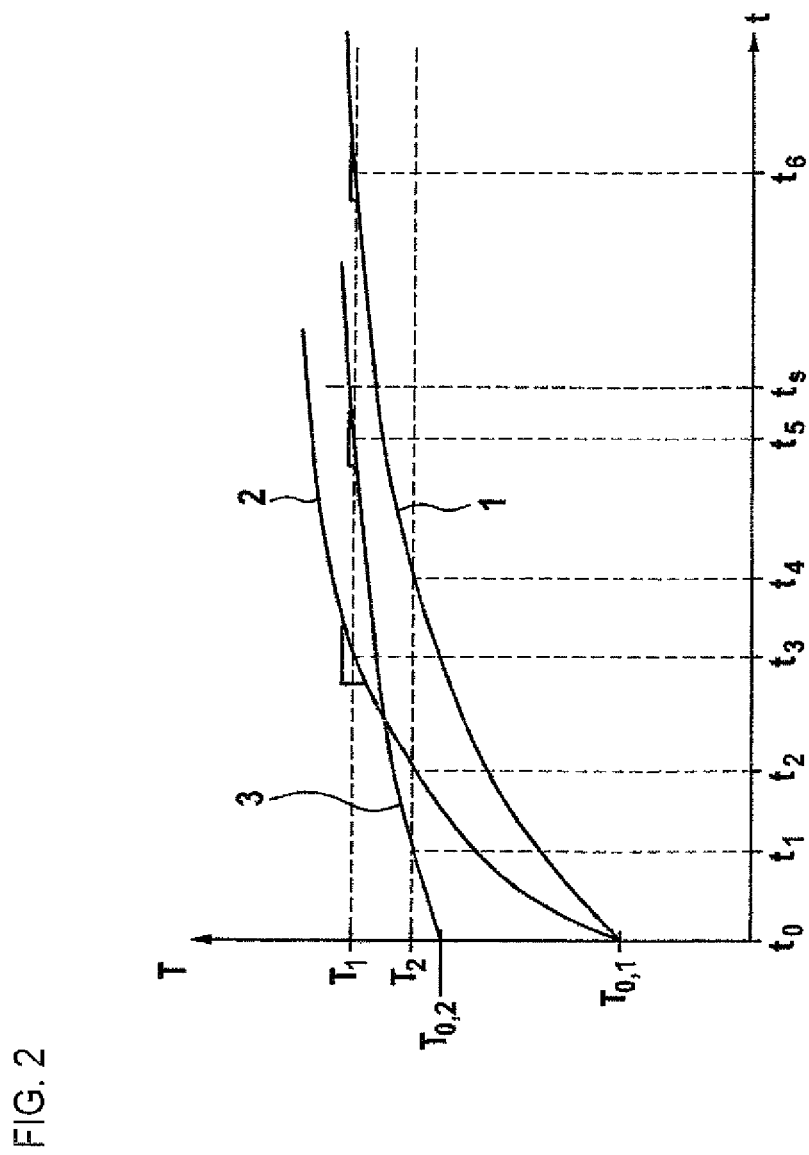
FIG. 2 shows a diagram depicting curves of probe temperatures as a function of time.

FIG. 2 is a diagram depicting respective curves 1, 2, 3 of probe temperatures T of the exhaust gas probe 12 as a function of time t. With reference to the curves 1, 2, 3 the method for recognizing a defect of the probe heater 14 of the exhaust gas probe 12 in accordance with the present invention will now be described.

For example, the operativeness of the probe heater 14 can be checked after elapse of a predefined time interval after start of heating at $t_0$, by checking whether the probe temperature T has exceeded a temperature limit value $T_1$. The predefined time interval ends, for example, at time instance $t_S$. It becomes readily apparent that the probe temperature T according to curve 1 has not, as of yet, reached the temperature limit value $T_1$. This is an indication that the probe heater 14 is defective. In comparison thereto, the curve 2 shows the probe temperature T at a properly operating probe heater 14. In this case, the temperature limit value $T_1$ is reached and exceeded at time instance $t_3$, so that the probe temperature T at time instance $t_3$, i.e. after elapse of the predefined time interval after start of heating, has a value which significantly exceeds the temperature limit value $T_1$. The curves 1 and 2 start hereby from a probe temperature T at the start of heating at $T_{0,1}$.

When the initial temperature is, however, higher, for example at $T_{0,2}$, as this is the case for the probe temperature T according to the curve 3, there may be a situation that the probe temperature T is greater than the temperature limit value $T_1$ after elapse of the predefined time interval, i.e. at time instance $t_S$, even though the probe heater is defective. As shown in FIG. 2, based on the higher initial temperature $T_{0,2}$, the probe temperature T reaches according to curve 3 the temperature limit value $T_1$ already at time instance $t_5$, i.e. prior to the time instance $t_S$.

To address this scenario and to check more reliably the operativeness of the probe heater 14, it is proposed to determine with a determination device 18 during the heating phase a temperature growth value which corresponds to an increase in temperature of the exhaust gas probe 12. When the temperature growth value deviates from an input value, a defect of the probe heater 14 is indicated. For example, a probe temperature gradient can be used as temperature growth value, whereas the input value is represented by a gradient limit value. When the probe temperature gradient falls short of the gradient time value, then this is an indication that the probe heater 14 is defective.

For example, the probe temperature gradient is determined, when the probe temperature T exceeds the temperature limit value $T_1$. This is indicated for the curves 1, 2, and 3, respectively. In curve 1, the probe temperature T reaches the temperature limit value $T_1$ at time instance $t_6$ so that the probe temperature gradient is determined only at that time instance. In curve 2, the probe temperature gradient is determined already at time instance $t_3$, whereas in curve 3, the probe temperature gradient is determined at time instance $t_5$. Comparing the curves 1, 2, 3, it becomes readily apparent that the probe temperature gradients according to curves 1 and 3 are significantly smaller than the probe temperature gradient according to curve 2. Thus, the operativeness of the probe heater 14 can be ascertained on the basis of the magnitude of the probe temperature gradient. When the probe temperature gradient falls short of the gradient limit value, then the probe heater 14 is defective.

In addition, or as an alternative, the temperature growth value may also be represented by a time period between reaching a first temperature value $T_2$ and reaching a second temperature value $T_1$ by the probe temperature T. When the time period exceeds a time limit value, used as input value, then this is an indication that the probe heater 14 is defective. For curve 1, the time period lies between the time instances $t_4$ and $t_6$, for curve 2, the time period lies between the time instances $t_2$ and $t_3$, and for curve 3, the time period lies between the time instances $t_1$ and $t_5$. It is readily apparent that the time period for curve 2 is the shortest, whereas the time periods for curves 1 and 3 are significantly longer. Thus, based on the time period, the operativeness of the probe heater 14 can be reliably checked by the determination device 18.

Provision can be made, of course, for all embodiments to compare the probe temperature T with the temperature limit value $T_1$ after elapse of the predefined time interval, i.e. at time instance $t_S$, for example. When the probe temperature T falls short of the temperature limit value $T_1$, then the presence of a defect of the probe heater 14 can be recognized. Provision may be made for this condition to be met in addition to the afore-described criteria. However, it may also be possible to recognize the presence of a defect of the probe heater 14, when only one of the criteria is met. A method according to the present invention is thus able to reliably check the operativeness of the probe heater 14 of the exhaust gas probe 12.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A method of operating a drive device of a motor vehicle having an internal combustion engine, said drive device including an exhaust gas probe arranged in an exhaust tract, a probe heater operably connected to the exhaust gas probe for heating the exhaust gas probe, a temperature sensor operably connected to the exhaust gas probe, and a determination device operably connected to the temperature sensor, comprising:

measuring a probe temperature of the exhaust gas probe in the exhaust tract using the temperature sensor disposed at the exhaust gas probe, as the exhaust gas probe is heated by the probe heater;

determining a temperature growth value representative of an increase in temperature of the exhaust gas probe during heating of the exhaust gas probe by the probe heater using the determination device;

checking after elapse of a predefined time interval after start of heating of the exhaust gas probe whether the probe temperature falls below a temperature limit value using the determination device, in response to the measured probe temperature exceeding the temperature limit value, determining a probe temperature gradient as the temperature growth value corresponding to a temperature increase of the exhaust gas probe using the determination device, and in response to both the measured probe temperature gradient falling short of an input gradient limit value and the measured probe temperature falling short of the temperature limit value, recognizing a defect of the probe heater using the determination device only after both conditions have been met.

2. The method of claim 1, wherein the probe temperature gradient is determined by measuring the probe temperature at a first time instance and measuring the probe temperature at a second time instance.

3. The method of claim 1, wherein the probe temperature gradient is determined by ascertaining a time period between reaching of a first temperature value and reaching a second temperature value by the probe temperature.

4. The method of claim 3, wherein the first and second temperature values are selected greater than the probe temperature at a start of heating of the exhaust gas probe.

5. The method of claim 1, wherein the time interval is determined on the basis of the probe temperature at a start of heating of the exhaust gas probe.

6. A drive device of a motor vehicle having an internal combustion engine, comprising:

an exhaust gas probe arranged in an exhaust tract;

a probe heater operably connected to the exhaust gas probe and configured to heat the exhaust gas probe at least temporarily;

a temperature sensor operably connected to the exhaust gas probe and configured to measure a probe temperature; and a determination device operably connected to the temperature sensor and configured to ascertain a temperature growth value representative of an increase in temperature of the exhaust gas probe during heating of the exhaust gas probe by the probe heater, said determination device configured to check after elapse of a predefined time interval after start of heating of the exhaust gas probe whether the probe temperature falls below a temperature limit value, said determination device configured to determine a probe temperature gradient as the temperature growth value corresponding to a temperature increase of the exhaust gas probe in response to the probe temperature exceeding the temperature limit value, wherein the determination device is configured to recognize a defect of the probe heater in response to both the measured probe temperature gradient falling short of an input gradient limit value and the measured probe temperature falling short of the temperature limit value, wherein the defect is recognized only after both conditions have been met.

* * * * *